Patented Dec. 6, 1932

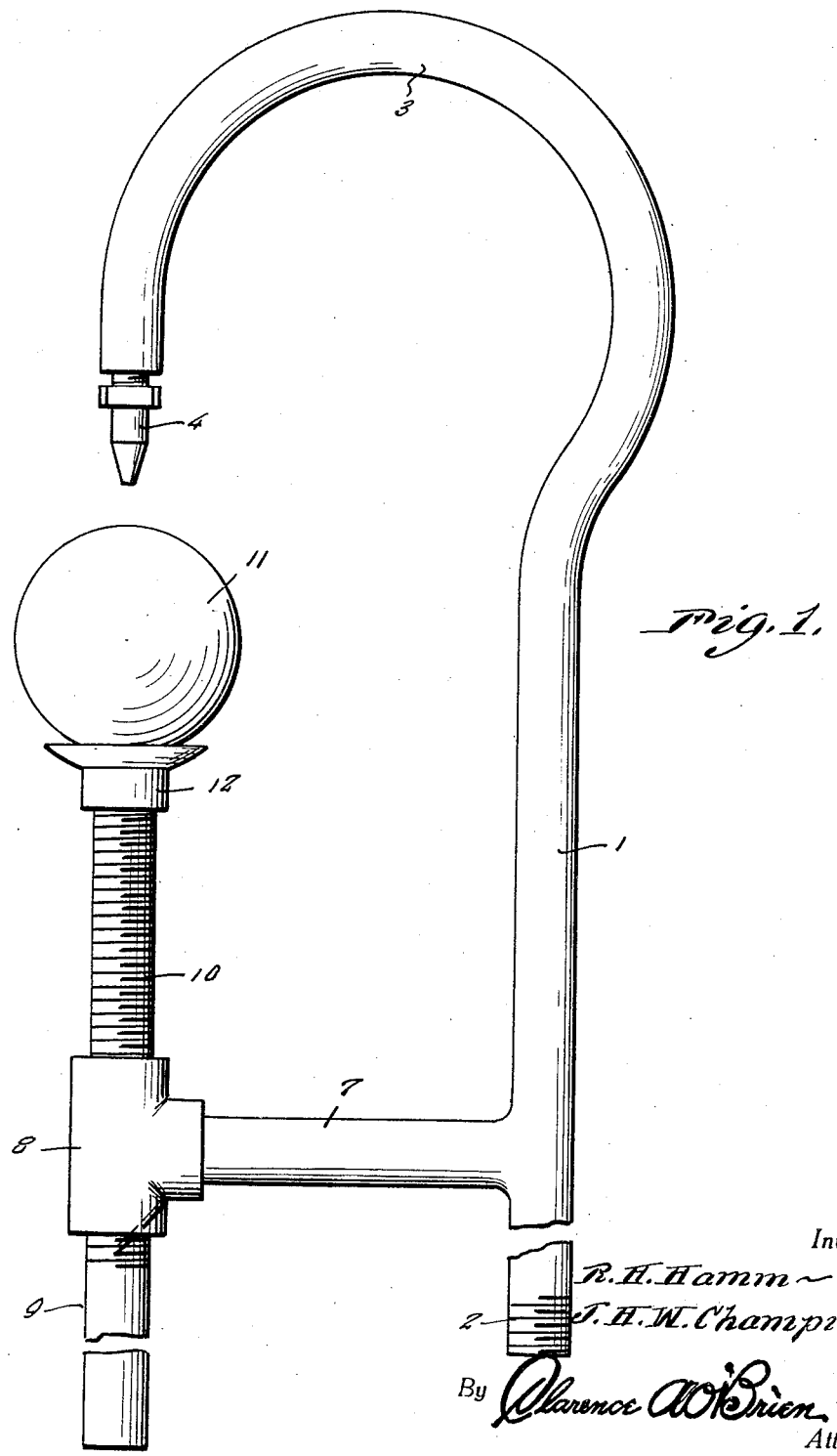

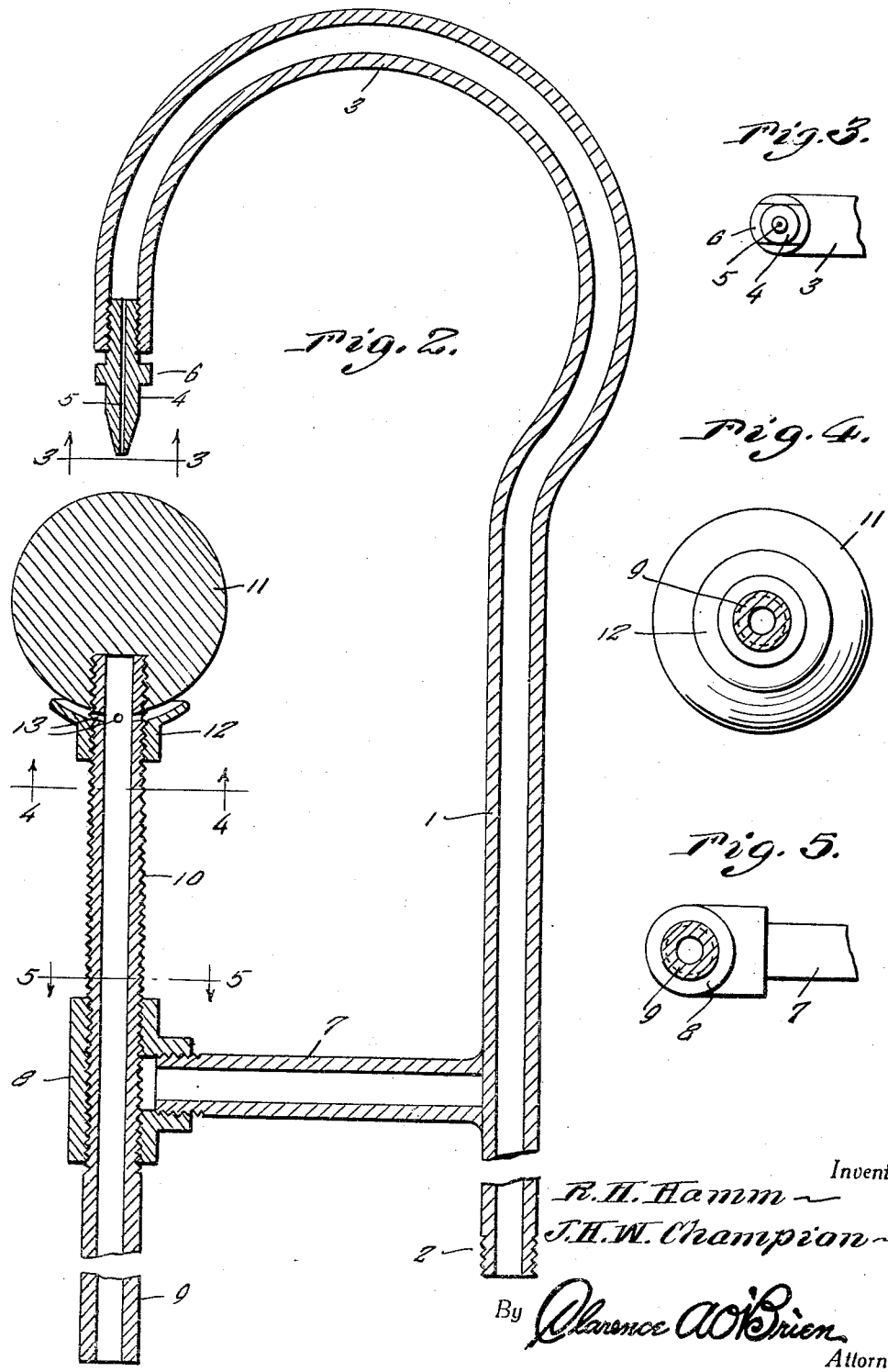

1,890,084

UNITED STATES PATENT OFFICE

RAY H. HAMM AND JOHN H. W. CHAMPION, OF PHOENIX, ARIZONA, ASSIGNORS TO ARIZONA GROCERY COMPANY, OF PHOENIX, ARIZONA, A CORPORATION OF ARIZONA

FRUIT AND VEGETABLE STAND SPRAY

Application filed July 29, 1931. Serial No. 553,864.

This invention relates to a fruit and vegetable stand spray and has for one of its important objects to provide, in a manner as hereinafter set forth, a device of this character embodying a novel construction, combination and arrangement of parts through the medium of which they may be expeditiously adjusted as desired to function efficiently when the water supply thereto is at various pressures.

Another important object of the invention is to provide a fruit and vegetable stand spray of the character set forth embodying novel means for draining the excess water which is not converted into spray without said excess water coming into contact with the fruit and vegetables.

Other objects of the invention are to provide a fruit and vegetable stand spray of the character described which will be simple in construction, strong, durable, reliable in operation, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a fruit and vegetable stand spray constructed in accordance with the present invention.

Figure 2 is a view in vertical section through the device.

Figure 3 is a detail view in bottom plan of the nozzle.

Figure 4 is a horizontal sectional view taken substantially on the line 4—4 of Figure 2, looking upwardly as indicated by the arrows.

Figure 5 is a horizontal sectional view taken substantially on the line 5—5 of Figure 2 looking downwardly as indicated by the arrows.

Referring now to the drawings in detail, it will be seen that the fruit and vegetable stand spray constituting the present invention comprises an upright water conduit 1 having its lower end portion threaded, as at 2, for connection with a suitable supply pipe (not shown).

At its upper end, the conduit 1 terminates in a gooseneck 3 having a nozzle 4 threaded into its free end portion and depending therefrom, said nozzle having a restricted passage therethrough for discharging the water in a fine stream or jet and under considerable pressure. This passage is designated by the reference numeral 5.

The nozzle 4 is further provided with a suitable head 6 for engagement by a tool, such as a wrench, for inserting or removing the nozzle.

Extending horizontally from an intermediate portion of the conduit 1 is an arm 7 which is secured to said conduit by any suitable means such as soldering or welding. Mounted on the free end portion of the arm 7 is a vertically disposed T 8 through which is threaded for vertical adjustment a drain pipe 9, the upper portion of which is threaded, as at 10.

A ball 11 is threaded on the upper end portion of the drain pipe 9 and is disposed beneath the nozzle 4. The drain pipe 9 constitutes means for supporting the ball 11 and for adjusting said ball vertically toward and away from the nozzle 4, as will be readily apparent.

A drip cup 12 is threadedly mounted on the upper portion of the drain pipe 9 in spaced relation beneath the ball 11. The drain pipe 9 is provided, within the drip cup 12, with a plurality of drain ports 13 which establish communication between the cup 12 and the interior of the drain pipe.

In use, the water is discharged from the conduit 1 through the nozzle 4 in a fine jet or stream against the top of the ball 11 and is converted into a spray which is thrown equally in all outward directions. As the pressure of the water may vary, the drain pipe 9 is threaded adjusted vertically in the T 8 to move the ball 11 toward and away from the nozzle 4.

What water from the nozzle 4 is not converted into spray and drips downwardly around the ball 11 is caught in the drip cup 12 and passes through the ports 13 and flows downwardly through the drain pipe 9. A suitable receptacle (not shown) may be disposed beneath the lower end of the drain pipe 9 for receiving this excess water.

It is believed that the many advantages of a fruit and vegetable stand spray constructed in accordance with the present invention will be readily understood, and although the preferred embodiment of the invention is as illustrated and described, it is to be understood that changes in the details of construction, and in the combination and arrangement of parts may be resorted to which will fall within the scope of the invention as claimed.

We claim:

In a spray device, an upright feed pipe having a depending outlet portion provided with a nozzle, said feed pipe being provided with a lateral arm having a T-coupling, a drain pipe threaded through said T-coupling and adjustable with respect thereto, a spherical deflector threaded onto said drain pipe immediately below said nozzle, and a collector cup threaded on said drain pipe below said spherical deflector, said drain pipe being provided below said spherical deflector and said collector with drain openings, said drain pipe being provided with a single screw thread providing for the attachment of the pipe to the coupling, and for the mounting of the spherical deflector and collector.

In testimony whereof we affix our signatures.

RAY H. HAMM.
JOHN H. W. CHAMPION.